United States Patent [19]

Hinoshita et al.

[11] 3,898,378

[45] Aug. 5, 1975

[54] VIDEO SIGNAL TRANSMISSION SYSTEM

[75] Inventors: Shigehiko Hinoshita, Yokohama; Yukihiko Minejima, Kawasaki; Takao Moriya, Yamato, all of Japan

[73] Assignee: Fujitsu Limited, Kawasaki, Japan

[22] Filed: July 26, 1973

[21] Appl. No.: 382,884

[30] Foreign Application Priority Data

July 27, 1972 Japan .............................. 47-74574

[52] U.S. Cl. .............................. 178/6.8; 178/DIG. 3
[51] Int. Cl.² .............................. H04N 7/12
[58] Field of Search .............................. 178/6, 6–8, 178/DIG. 3; 179/15 BW, 15.55 R; 325/38 R, 38 A, 38 B

[56] References Cited

UNITED STATES PATENTS

| | | | |
|---|---|---|---|
| 3,707,680 | 12/1972 | Gabbard | 325/38 B |
| 3,723,879 | 3/1973 | Kaul | 179/15.55 R |
| 3,729,678 | 4/1973 | Glasbergen | 325/38 A |
| 3,736,373 | 5/1973 | Pease | 178/6 |
| 3,769,451 | 10/1973 | Conner | 178/6 |

*Primary Examiner*—Howard W. Britton
*Attorney, Agent, or Firm*—Staas & Halsey

[57] ABSTRACT

A video signal transmission system for reduced bandwidth transmission defines each picture frame to include at least two picture element series $A_{ij}$, $B_{ij}$, . . . A regularly selective transmitter selects the video picture element signals of a given series, in succession for all such series, in corresponding, successive picture frame periods, the selected signals being predictively coded for transmission. In the receiver, a frame memory stores the predictively coded signals for all picture element series of an entire picture frame, the content of the memory being renewed, or updated, in each successive frame period with the picture element signals of the received, corresponding series. The frame memory is read out completely during each frame period, and the predictively coded signals are decoded and combined to produce the output video signal for a complete picture frame.

6 Claims, 10 Drawing Figures

VIDEO SIGNAL TRANSMISSION SYSTEM

BACKGROUND OF THE INVENTION

1. Field of the Invention

This invention relates to a picture transmission system, and more particularly to improvements in or relating to video signal transmission system of the type effecting band width compression.

2. Description of the Prior Art

The so-called regular replenishment system has been proposed, as a band width compression system for picture transmission, in which a memory for storing video signals of one picture (hereinafter referred to as a frame memory) is provided on the receiving side and signals of one frame having regularly removed therefrom picture elements in accordance with a predetermined pattern are selectively transmitted and all picture elements of the frame memory are rewritten by transmitting a plurality of frames to provide a new picture as disclosed, for example, in *Bell System Technical Journal* 1967, 1.) This system necessitates the use of a memory capable of storing all picture elements and inevitably makes the apparatus therefor bulky.

SUMMARY OF THE INVENTION

An object of this invention is to provide a picture transmission system which is free from the aforesaid defects experienced in the prior art and which provides further compression of the transmission band width and, at the same time, decreases the capacity of the frame memory.

The picture transmission system of this invention is featured mainly in that signals regularly selected by the transmitting station are transmitted after being subjected to predictive coding such as DPCM (Differential PCM) or the like and in that a frame memory capable of storing the predictively coded signals of an entire picture is provided on the receiving side. Generally, the video signal transmission system of this invention includes a transmission station for transmitting a video signal over a suitable transmission medium to be received by a receiving station. In particular, the transmitting station includes a regularly selective transmitter for removing selected picture element signals from the video signal, for separating the video signal into a plurality of series and for sequentially providing within a given frame an output for each series, and a predictive coding circuit responsive to the outut of the regularly selective transmitter for predictive coding the selected video signal series and for transmitting same to the transmission medium. Further, the receiving station includes a synchronizing signal generator for generating a clock signal and a horizontal synchronizing signal, a frame memory for storing a predictively coded signal corresponding to a video signal of one frame, a data replacing circuit responsive to the output of the synchronizing signal generator for storing the corresponding predictively coded signal series in the frame memory in place of the received predictively coded signal series, a distributor circuit responsive to the output of the synchronizing signal generator for distributing the output of the frame memory to the respective coded signal series, a plurality of predictive decoding means for decoding the coded signal series, respectively, and a data combining circuit for combining together the respective output of said plurality of predictive coding means.

BRIEF DESCRIPTION OF THE DRAWINGS

This invention will be more readily understood by reference to the following detailed description and to the accompanying drawings, in which.

DESCRIPTION OF THE PREFERRED EMBODIMENTS

With reference to the drawings, the present invention will be described in detail.

Figure 1:
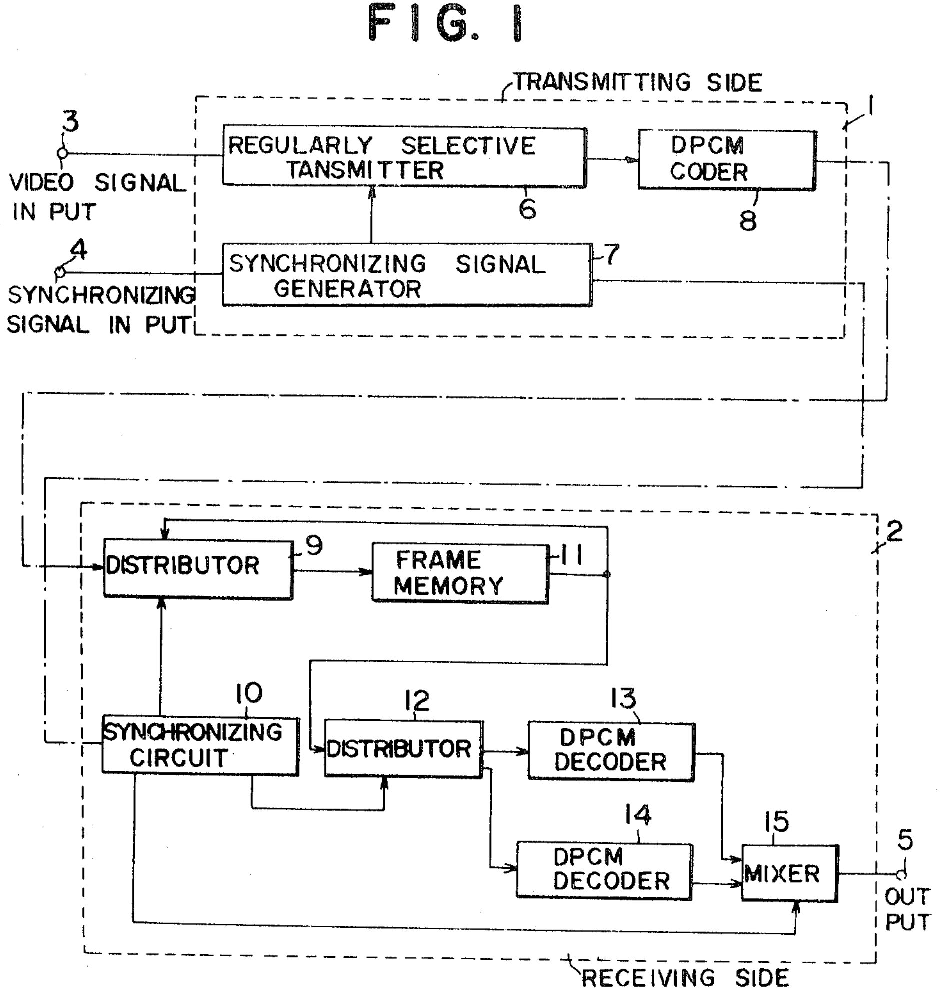
FIG. 1 is a block diagram illustrating one example of this invention.
Figure 2:
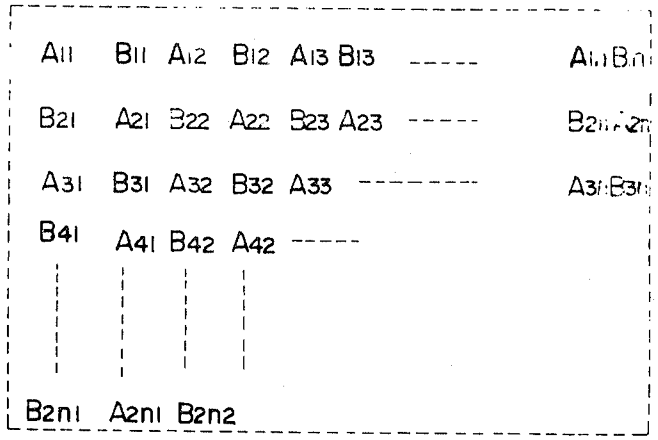
FIG. 2 shows one example of a pattern, for explaining regularly selective transmission.

FIG. 1 shows in block form one example of this invention system and FIG. 2 one example of a pattern, for explaining regularly selective transmission. In FIG. 1, broken-line blocks 1 and 2 are transmitting and receiving stations, respectively. Reference numeral 3 indicates a video signal input terminal, 4 refers to a synchronizing signal input terminal and 5 identifies a video signal output terminal. In the transmitting station 1, reference numeral 6 designates a regularly selective transmitter, 7 indicates a synchronizing signal generator, and 8 refers to a DPCM coder. In the receiving station, reference numeral 9 identifies a distributor, 10 a synchronizing circuit, 11 a frame memory, 12 a distributor, 13 and 14 DPCM decoders, and 15 a mixer.

In FIG. 2, reference characters A*ij*, B*ij* ($i$=1, 2, 3, . . . 2$n$ and $j$= 1, 2, 3, . . . $n$) represent picture elements making up a picture frame having even numbers of picture elements in horizontal and vertical directions. For example an A*ij* signal series is transmitted in a first frame, and a B*ij* signal series is transmitted in the next subsequent, second frame. In the transmitting station 1 of FIG. 1, a video signal input applied to the input terminal 3 is regularly selected by the regularly selective transmitter 6 and the A*ij* series signals are applied to the DPCM coder 8, for example, in an order of $A_{11}$, $A_{12}$, $A_{13}$, . . . $A_{21}$, $A_{22}$, . . . $A_{31}$, . . . and are thereby converted into DPCM signals $A_{11}'$, $A_{12}'$, $A_{13}'$, . . . $A_{21}'$, $A_{22}'$, . . . $A_{31}'$, . . . (hereinafter identified as A*ij*'), thereafter being sent out to a transmission line or medium. In the transmitting station 1 side, the synchronizing signal generator 7 is provided, by means of which a horizontal synchronizing signal and a picture element clock signal are generated from a picture synchronizing signal input fed through the terminal 4. With the output from the synchronizing signal generator 7, the regularly selective transmitter 6 regularly selects picture element signals and applied them to the DPCM coder 8. The DPCM coded signal and the synchronizing signal are sent out to the transmission line.

In the receiving station 2, there is provided the frame memory 11, which has stored therein the DPCM signal A*ij*' for the A*ij* series signal and a DPCM signal B*ij*' for the B*ij* series signal. Upon reception of the signal A*ij*' by the distributor 9, the signal A*ij*' stored in the frame memory 11 is rewritten and renewed and, upon reception of the signal B*ij*', the signal B*ij*' in the frame memory 11 is renewed. In the distributor 12, the latest DPCM signals in the frame memory 11, thus renewed, are separated into A*ij*' and B*ij*', which are demodulated by the DPCM decoders 13 and 14 into the signals A*ij* and B*ij* respectively. The demodulated signals A*ij* and B*ij* are combined together by the mixer 15 in accordance with a regularly selective pattern of FIG. 2 to provide a composite video signal, which is derived at the output terminal 5. The synchronizing circuit 10 provided on the receiving side 2 generates a horizontal synchronizing signal and a picture element clock signal, which are synchronized with those on the transmitting side 1, and applies them to the distributors 9 and 12 and the mixer 15.

Next, each block in FIG. 1 will be described in detail.

Figure 3:
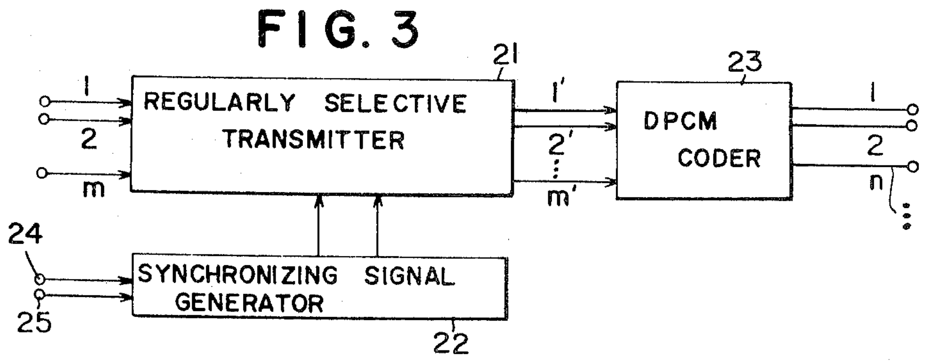
FIG. 3 is a block diagram showing a transmitting station capable of being used in the example of FIG. 1.

FIG. 3 shows in block form the transmitting station 1 of FIG. 1. Reference numeral 21 indicates a regularly selective transmitter, 22 a synchronizing signal generator and 23 a DPCM coder. The synchronizing signal generator 22 is supplied with a horizontal scanning clock pulse 24 and a picture element clock pulse 25 to provide a predetermined horizontal synchronizing signal and a picture element clock signal. The regularly selective transmitter 21 is supplied with a PCM code as a video signal input and performs such an operation as described previously with regard to the regularly selective transmitter 6 in FIG. 1.

Figure 4:
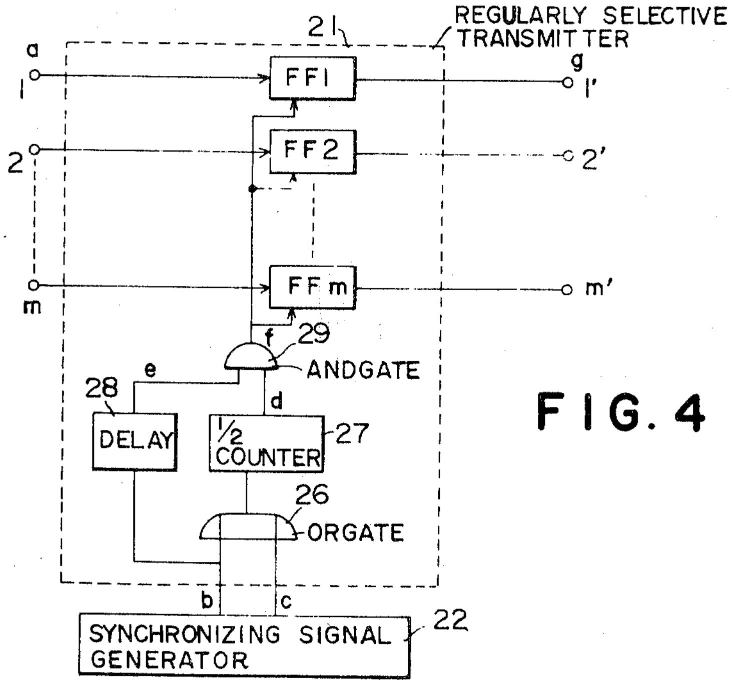
FIG. 4 is a block diagram illustrating a concrete circuit construction of a regularly selective transmitter employed in FIG. 3.

One example of a concrete circuit construction of the regularly selective transmitter 21 herein used is shown in FIG. 4.

Figure 5:
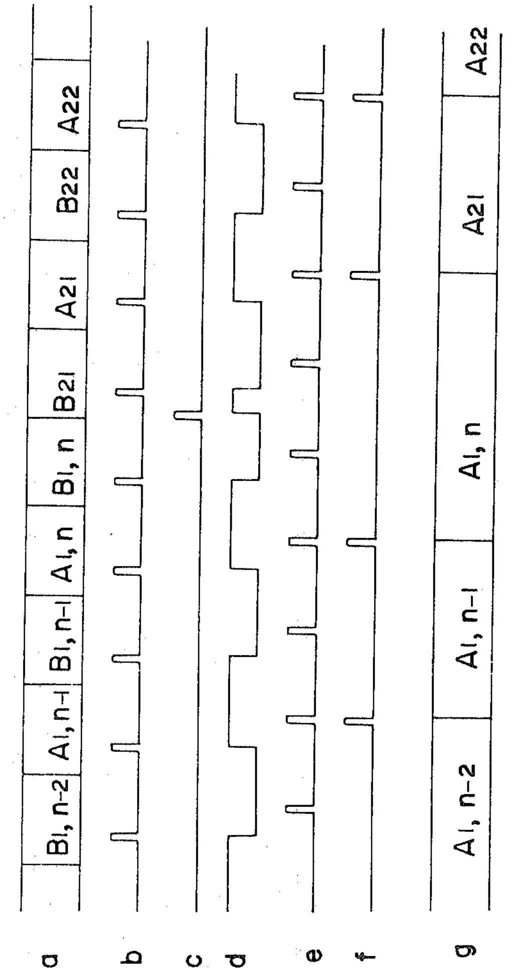
FIG. 5 is a time chart, for explaining the operation of the regularly selective transmitter depicted in FIG. 4.

In FIG. 4, reference characters FF1, FF2, . . . FFm designate flip-flops. The broken-line block 21 represents the regularly selective transmitter. Reference numeral 22 indicates a synchronizing signal generator, 26 refers to an OR gate, 27 indicates a ½ counter, 28 represents a delay circuit and 29 identifies an AND gate. The regularly selective transmitter will be described in connection with the picture elements depicted in FIG. 2. Let it be assumed that the A*ij* series composed of the picture elements of the A series, that is, $A_{11}$, $A_{12}$, $A_{13}$, . . . $A_{21}$, $A_{22}$, . . . $A_{31}$, . . . is transmitted and that an input video signal *a* is composed of PCM parallel signals of *m* bits applied to terminals 1, 2, . . . *m*. The synchronizing signal generator 22 provides a picture element clock pulse *b* and a horizontal scanning clock pulse *c*. These signals are applied to the OR gate 26 to derive therefrom an OR output, which is counted down by half by the ½ counter 27 and then applied to the AND gate 29 which is supplied with the output from the delay circuit 28. With the output from the AND gate 29, the flip-flops FF1, FF2, . . . FFm are opened and closed. The waveforms of these signals are as depicted in FIG. 5, in which they are marked with reference characters *a*, *b*, *c*, *d*, *e*, *f* and *g* corresponding to those letters indicating the respective terminals in FIG. 4. Thus, outputs appearing at output terminals 1', 2', . . . *m'* are arranged in such a form as indicated by *g* in FIG. 5.

The predictive coder 23 is, for example, a DPCM coder. The DPCM (Differential PCM) is known as a predictive coding system which well matches the property of the video signal and is disclosed, for example, in *Bell System Technical Journal*, Vol. 50, No. 2, Feb. (1972), J. B. Millard et al "Digital Encoding of the Video Signal". The predictive coder 23 predictively codes a PCM signal of *m* bits and converts it into a DPCM signal of *n* bits, where $n<m$.

Generally, in the PCM system, each signal is composed of, for example, seven bits; but, in the DPCM system, it is composed of four bits. Accordingly, with the use of the DPCM system as in the present invention, the transmission band width and the capacity of the frame memory can be compressed down to 4/7 as compared with those in the case where a regularly selected video signal is transmitted with the PCM system as in the prior art.

Figure 6:
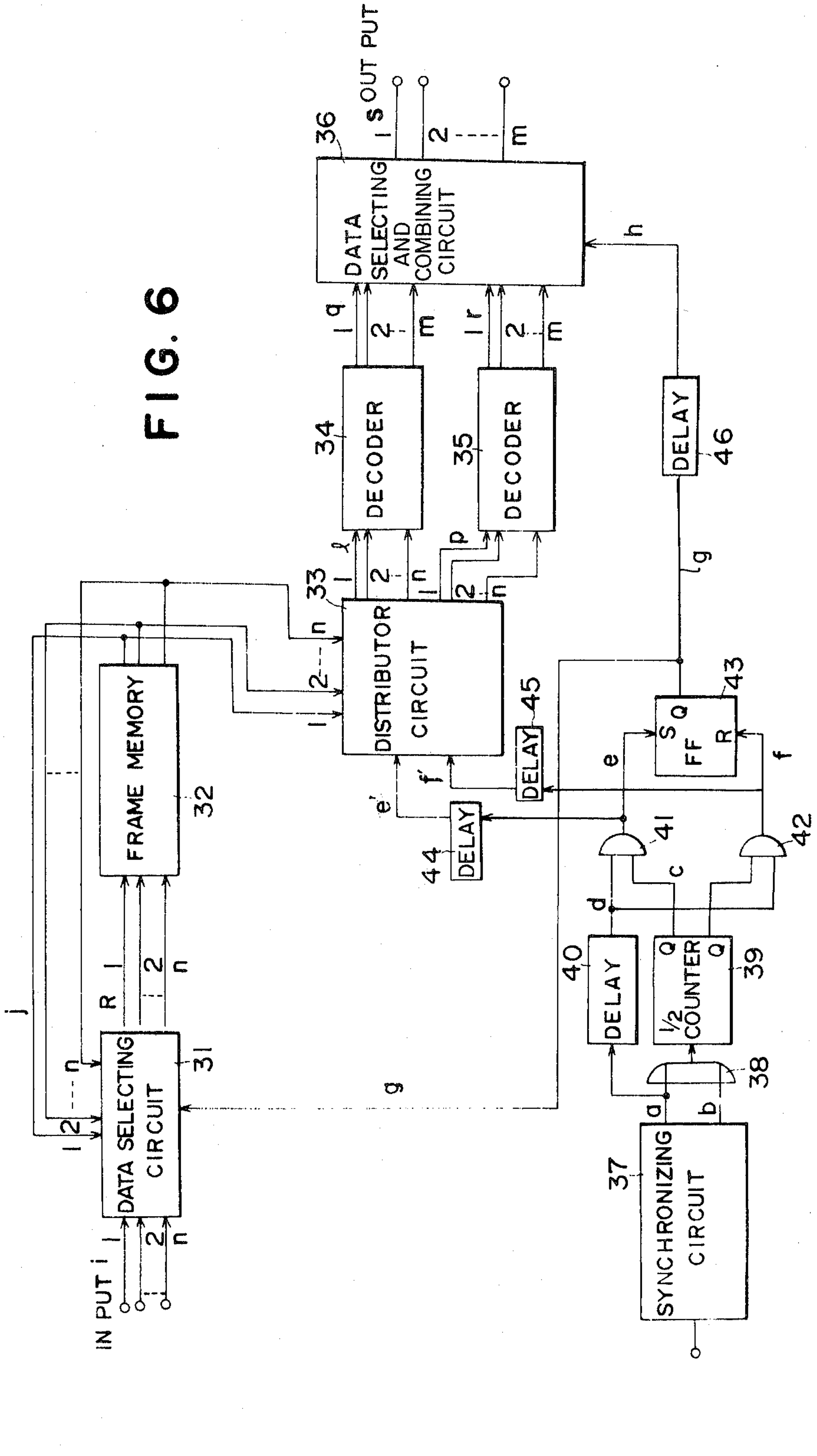
FIG. 6 is a block diagram showing an illustrative detailed construction of a receiving station employed in FIG. 1.
Figure 7:
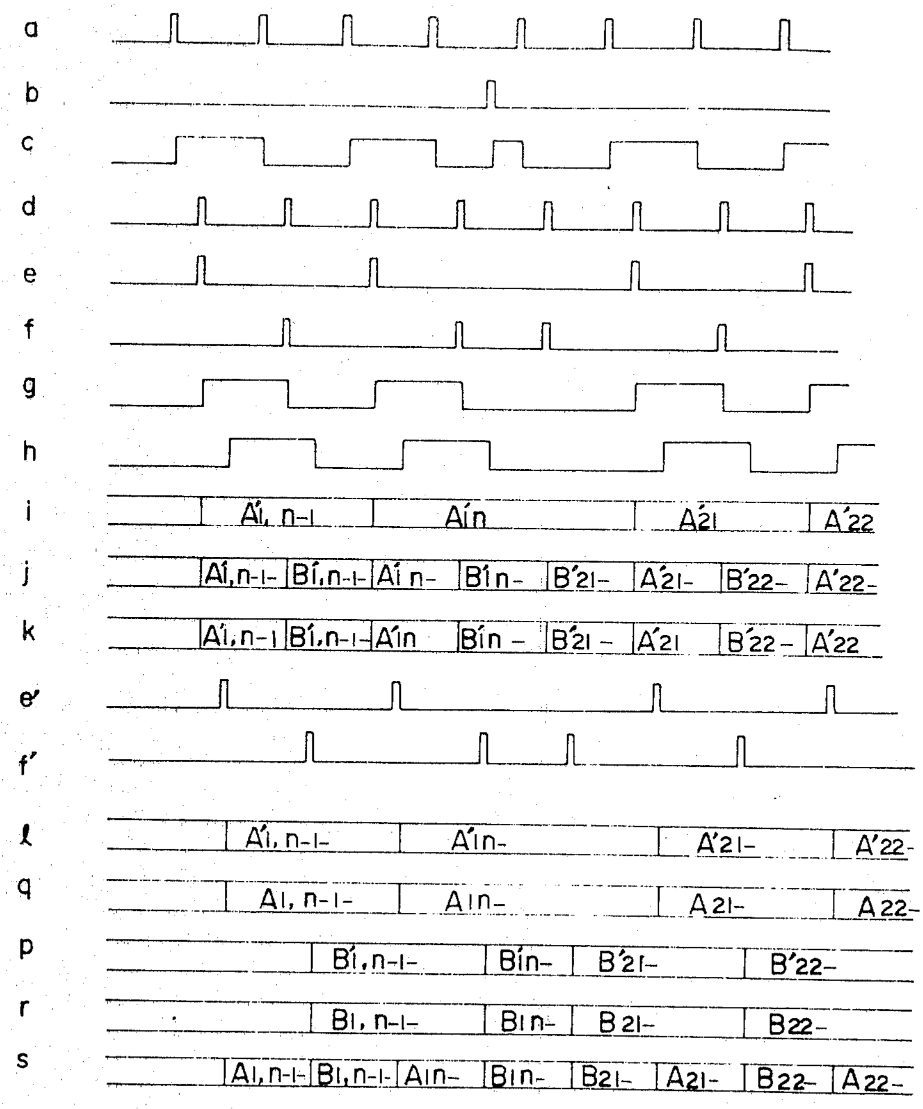
FIG. 7 shows time charts, for explaining the operations of the respective blocks of FIG. 6.

FIG. 6 illustrates an illustrative embodiment of the receiving station in FIG. 1, and FIG. 7 shows a time chart, for explaining the operation of each block in FIG. 6. In FIG. 6, reference numeral 31 identifies a data selecting circuit, 32 refers to a frame memory, 33 specifies a distributor circuit, 34 and 35 indicate decoders and 36 refers to a data selecting circuit. Reference numeral 37 designates a synchronizing circuit, 38 represents an OR gate, 39 a ½ counter, 40 relates to a delay circuit, 41 and 42 designate AND circuits, 43 refers to an R-S flip-flop, and 44, 45 and 46 represent delay circuits. The frame memory 32 has stored therein an *n*-bit DPCM signal A*ij*' for the signal series A*ij* and an *n*-bit DPCM signal B*ij*' for the signal series B*ij*, as described previously. When an *n*-bit predictive code *i* (refer to FIG. 7) is applied to the input of the data selecting circuit 31, that is, when predictive codes, for example, $A'_{1,n-1}$, $A'_{1,N}$, $A'_{2,1}$, $A'_{2,2}$ . . . (predictive codes being identified with primes) of the series A are received, only the series A in the frame memory 32 is rewritten. The signal *g* applied to the data selecting circuit 31 is a control signal described later and the signal series stored in the frame memory 32 is indicated by $A'_{1,n-1,-}$, $B'_{1,n-1,-}$, $A'_{1,n,-}$, $B'_{1,n,-}$, $B'_{2,1-}$, $A'_{2,1-}$, $B'_{2,2-}$, $A'_{2,2,-}$, . . . (signals from the frame memory being identified with suffixes $_-$) in FIG. 7*j*. In the data selecting circuit 31, when the series A is received, only the series A of the signals stored in the frame memory is rewritten and, when the series B is received, only the series B is rewritten. FIG. 7*k* shows the case where only the series A has been rewritten.

The distributor circuit 33 separates the content of the DPCM signal series thus rewritten and renewed into signals A*ij*' and B*ij*' with control signals *e'* and *f* described later to provide signals *l* and *p* (refer to FIG. 7). The decoders 34 and 35 demodulate the signals A*ij* and B*ij* from those A*ij*' and B*ij*' respectively to produce signals *q* and *r* (refer to FIG. 7). The data selecting circuit 36 combines, under the action of a control pulse *h*, the signals A*ij* (of the waveform *q*) and B*ij* (of the waveform *r*) together in accordance with the regular selection pattern of FIG. 2, providing a video signal.

The circuit shown at the lower part in FIG. 6 is a control pulse generator circuit, in which a picture element clock signal *a* and a horizontal scanning clock signal *b* synchronized with the transmitting side are generated by the synchronizing circuit 37 from a synchronizing signal transmitted from the transmitting station and in which waveforms $d$ and $c$ are produced by the delay circuit 40 and the ½ counter 39, respectively. These signals are applied to the AND circuits 41 and 42 to derive therefrom outputs $e$ and $f$ respectively, which are fed to the R-S flip-flop 43 to set and reset it to produce a control signal $g$. The outputs $e$ and $f$ from the AND circuits 41 and 44 are applied to the delay circuits 44 and 45 to provide control signals $e'$ and $f'$ for the distributor circuit 33. The output pulse $g$ from the flip-flop 43 is used for controlling the data selecting circuit 31 and, at the same time, applied to the delay circuit 46 to produce the control pulse $h$ for the data selecting circuit 36.

Figure 8:
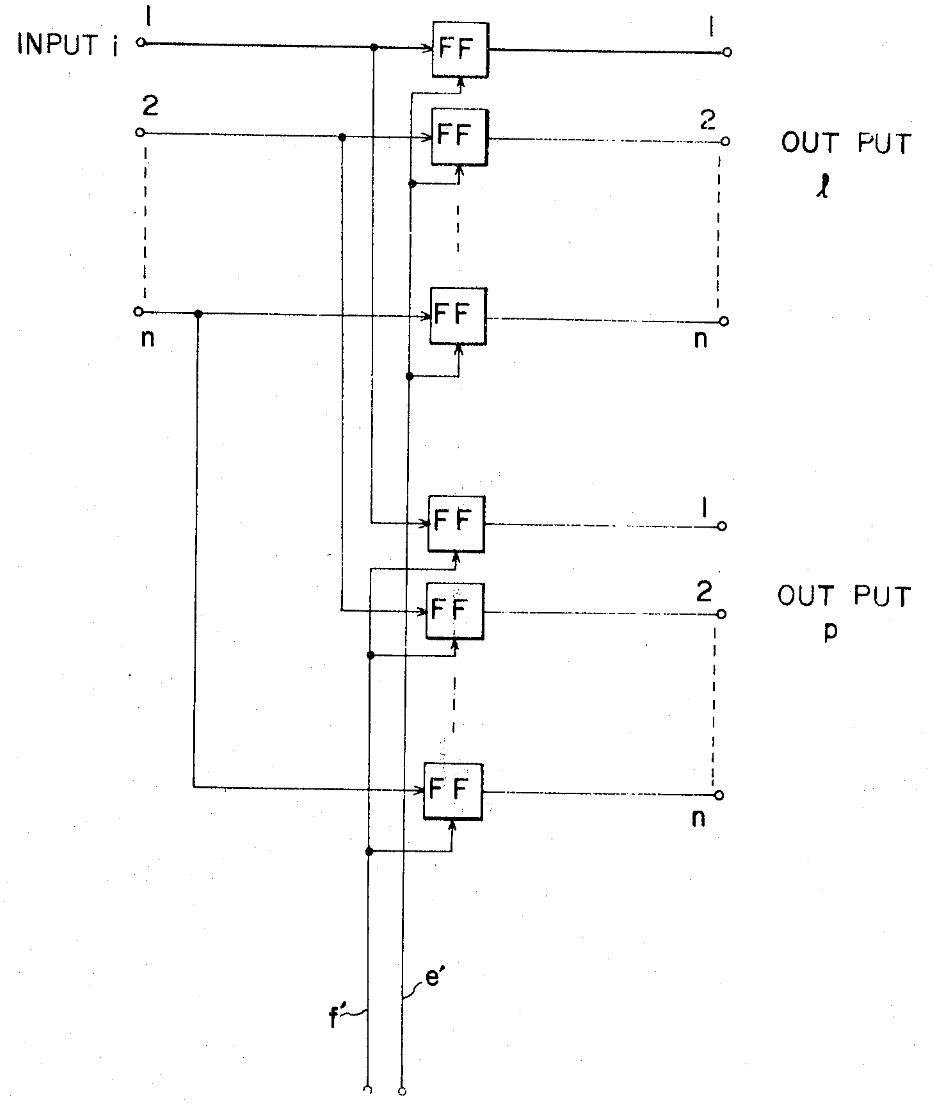
FIG. 8 is a block diagram showing an illustrative, concrete circuit of a distributor circuit employed in FIG. 6.

FIG. 8 shows an illustrative embodiment of a concrete construction of the distributor circuit 33. Reference character FF designates flip-flops. An n-bit input (the rewritten and renewed DPCM signal series of the frame memory 32) is separated by distribution clock signals $e'$ and $f'$ into the $Aij'$ and $Bij'$ series to provide outputs $l$ and $p$. The distribution clock signals $e'$ and $f'$ are control signals which are obtained by applying the aforesaid signals $e$ and $f$ to the delay circuits 44 and 45 respectively. The process of separation into the outputs $l$ and $p$ will be readily understood from the relation between the waveforms $k$, $e'$ and $f'$ in FIG. 7.

Figure 9:
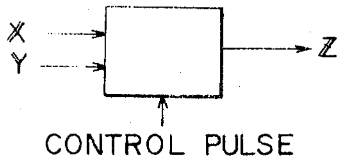
FIGS. 9 and 10 show circuit constructions, for explaining the operational principles of data selecting circuits used in FIG. 6.
Figure 10:
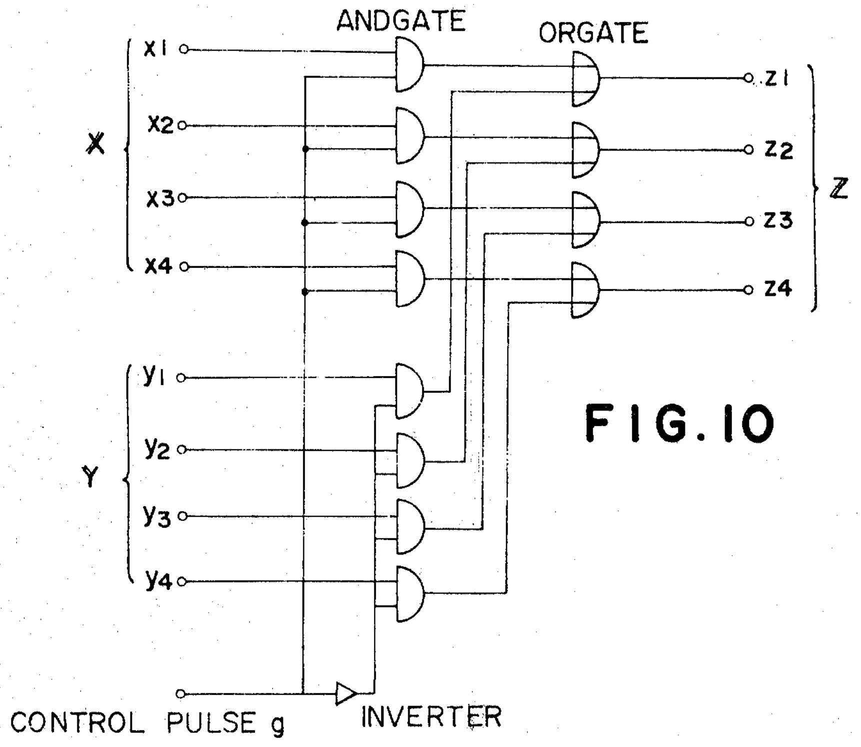

The data selecting circuits 31 and 36 shown in FIG. 6 will hereinbelow be described. The data selecting circuit is a circuit which is supplied with inputs X and Y and selectively derives therefrom the signal X or Y as its output Z in accordance with a control input, as illustrated in FIG. 9. Its concrete circuit construction is such as depicted in FIG. 10, in which the inputs X and Y are shown to be 4-bit codes. The output Z is indicated by $z_1$, $z_2$, $z_3$ and $z_4$ and the inputs X and Y are selectively switched dependent upon the control pulse $g$ (refer to FIG. 7). In the illustrated example, the control input to the AND gate is impressed through an inverter on the side of the input Y.

For the predictive coding, not only the aforesaid DPCM system but also $\Delta$ M, i.e., a delta modulation system and its various modified systems can be employed. Although the foregoing description has been given in connection with the regularly selective transmission and memory rewritting for ½ compression in FIG. 2, this invention in not limited specifically thereto but, of course, it is applicable to ⅓, ¼, . . . compression by dividing the signal series into many signal groups, for example, $Aij$, $Bij$, $Cij$, . . . .

Numerous changes may be made in the above-described apparatus and the different embodiments of the invention may be made without departig from the spirit thereof; therefore, it is intended that all matter contained in the foregoing description and in the accompanying drawings shall be interpreted as illustrative and not in a limiting sense.

We claim:

1. A video signal transmitting and receiving system for transmitting a video signal with compressed bandwidth, wherein each picture frame comprises plural series of picture elements, each said series comprising plural, respectively corresponding ones of said picture elements, said system comprising;

a transmitting station including:

a regularly selective transmitter selecting for transmission in a given frame time period, from the video signal corresponding to a picture frame, the picture element signals corresponding to a given said series of picture elements, and selecting in successive frame periods, the picture element signals corresponding to successive ones of said plural series of picture elements, and predictive coding means receiving the picture element signals of each said series thereof as selected by said regularly selective transmitter for transmission and predictively coding the said picture element signals of each said series; and a receiving station including:

a frame memory for storing the predictively coded picture element signals of a complete picture frame, a data replacing circuit for replacing the predictively coded picture element signals of each series thereof as stored in said frame memory with the predictively coded picture element signals of the corresponding series thereof, as received in a given frame period, means for reading out said frame memory, including a distributor circuit for distributing the predictively coded picture element signals read out from said frame memory in a given frame period into respectively corresponding, plural series of predictively coded signals, a plurality of decoding means receiving and decoding respectively corresponding ones of said plural series of predictively coded signals distributed by said distributor circuit and producing respectively corresponding plural series of decoded picture element output signals, and a data combining circuit receiving and combining the decoded picture element signals of said plural series thereof produced by said plurality of predictive decoding means, to produce an output video signal for all picture elements in each frame time period.

2. A video signal transmitting and receiving system as recited in claim 1 wherein said predictive coding means is of the DPCM type.

3. A video signal transmitting and receiving system as recited in claim 1 wherein said picture frame comprises two series of picture elements and wherein said regularly selective transmitter selects the said two series of picture element signals in alternate succession.

4. A video signal transmitting and receiving system as recited in claim 3, wherein:

said distributor circuit comprises plural flip-flop circuits respectively corresponding to said plural series outputs of said distributor circuit and receiving in common the picture element signals for all of said series as read from said frame memory, and said receiving station further includes means for supplying a clock signal selectively and in succession to said plural flip-flop circuits at the rate of the picture element signals as read from said frame memory, the outputs of respective ones of said plural flip-flops comprising the picture element signals of the respectively corresponding series thereof.

5. A video signal transmitting and receiving system as recited in claim 1 wherein said picture frame comprises first and second series of picture elements, and wherein:

said distributor circuit distributes the picture element signal outputs from said frame memory into respective first and second series of coded picture element signals, and said plurality of predictive decoding means comprises first and second decoding means for decoding the respective first and second series of predictively coded signals from said distributor circuit.

6. A video signal transmitting and receiving system as recited in claim 5 wherein each said predictively coded picture element signal comprises an *n* bit parallel signal and wherein:

said distributor circuit comprises first and second sets of *n* flip-flop circuits each, said sets respectively corresponding to said first and second series of coded picture element signals, and receiving in common the said first and second series of coded picture element signals read out from said frame memory, and wherein said receiving station further comprises means for supplying a clock signal at the rate of the picture element predictively coded signals alternately to the *n* flip-flop circuits of said first and second sets.

* * * * *

UNITED STATES PATENT OFFICE
CERTIFICATE OF CORRECTION

Patent No. 3,898,378 Dated August 5, 1975

Inventor(s) Shigehiko Hinoshita et al.

It is certified that error appears in the above-identified patent and that said Letters Patent are hereby corrected as shown below:

Column 3, line 2, "applied" should read -- applies --.

Column 4, line 38, "$A'_{1,N,}$" should read -- $A'_{1,n}$, --.

Column 5, line 52, "partig" should read -- parting --.

Signed and Sealed this

*twenty-seventh* Day of *January 1976*

[SEAL]

*Attest:*

RUTH C. MASON
*Attesting Officer*

C. MARSHALL DANN
*Commissioner of Patents and Trademarks*